United States Patent
Kennemer et al.

(10) Patent No.: US 9,156,319 B1
(45) Date of Patent: Oct. 13, 2015

(54) QUICK CHANGE DUAL PURPOSE DRAW BAR

(71) Applicant: Tractor Supply Company, Brentwood, TN (US)

(72) Inventors: Brian Kennemer, Chapel Hill, TN (US); Ty Rager, Hendersonville, TN (US)

(73) Assignee: Tractor Supply Company, Brentwood, TN (US)

( * ) Notice: Subject to any disclaimer, the term of this patent is extended or adjusted under 35 U.S.C. 154(b) by 0 days.

(21) Appl. No.: 14/156,668

(22) Filed: Jan. 16, 2014

(51) Int. Cl.
*B62D 53/06* (2006.01)
*B60D 1/145* (2006.01)
*B60D 1/52* (2006.01)
*B60D 1/07* (2006.01)

(52) U.S. Cl.
CPC . *B60D 1/145* (2013.01); *B60D 1/07* (2013.01); *B60D 1/52* (2013.01)

(58) Field of Classification Search
CPC .................................. B60D 1/145; B60D 1/52
USPC ............... 180/415.1, 416.1; 16/405, 406, 426
See application file for complete search history.

(56) References Cited

U.S. PATENT DOCUMENTS

| | | | | |
|---|---|---|---|---|
| 1,954,179 A | * | 4/1934 | Krug | 280/204 |
| 2,787,478 A | * | 4/1957 | Schmidt | 280/515 |
| 3,388,930 A | | 6/1968 | Miller | |
| 3,917,331 A | | 11/1975 | Duran | |
| 4,037,853 A | * | 7/1977 | Sparks | 280/204 |
| 5,340,134 A | * | 8/1994 | Dodson | 280/37 |
| 5,816,586 A | * | 10/1998 | Richmond | 280/47.34 |
| 6,581,246 B1 | | 6/2003 | Polette | |
| 6,662,679 B2 | | 12/2003 | Hobdy et al. | |
| 7,168,537 B2 | * | 1/2007 | Bellini | 190/115 |
| 7,210,697 B2 | | 5/2007 | Simpson | |
| 7,343,647 B1 | * | 3/2008 | Kinskey et al. | 24/3.13 |
| 7,384,051 B1 | * | 6/2008 | Haire | 280/47.34 |
| 2011/0173778 A1 | * | 7/2011 | Wales | 16/426 |

FOREIGN PATENT DOCUMENTS

GB 619786 3/1949

\* cited by examiner

*Primary Examiner* — Joseph Rocca
*Assistant Examiner* — Marlon Arce
(74) *Attorney, Agent, or Firm* — Lucian Wayne Beavers; Patterson Intellectual Property Law, PC

(57) ABSTRACT

A drawbar apparatus for a cart, wagon or trailer. The drawbar apparatus includes a shaft having a first end suitable for connection to a cart, and a second end including a hitch coupling. The drawbar includes a handle member having a handle first end and a handle second end. The handle first end is pivotally connected to the shaft, and the handle second end includes a grip or gripping region. The handle member is selectively pivotal between a first position and a second position, the hitch coupling extending distally beyond the handle member in the first position, and the handle member extending distally beyond the hitch coupling in the second position. Some embodiments further include a lock configured to selectively secure the handle member when the handle member is in the first position and the second position.

14 Claims, 5 Drawing Sheets

QUICK CHANGE DUAL PURPOSE DRAW BAR

BACKGROUND OF THE INVENTION

1. Field of Invention

The present disclosure relates generally to a drawbar for a cart, wagon, trailer, or other wheeled transport device that can be pulled behind a moving vehicle.

2. Description of the Prior Art

Conventional drawbars on carts, wagons, or trailers are equipped at one end with conventional hitch couplings such as a yoke or clevis. The hitch couplings can then be connected to the back of an automobile or a tractor. The automobile or tractor can then be used to transport objects or materials that can be loaded in the cart, wagon, or trailer.

More particularly, this invention pertains to drawbars for a cart, wagon, or trailer that can be configured to receive a handle assembly that can be attached to the hitch coupling. Conventional handle assemblies are removably attached to the hitch coupling via pins that must be inserted through the hitch coupling and the handle assembly. The handle assembly can then be used by an operator to pull the cart, wagon or trailer by hand.

One problem with conventional drawbars is that the handle assembly is an entirely separate piece. As such, when the handle assembly is not in use, it must be stored. Additionally, connecting the handle assembly to the drawbar by inserting pins through the hitch coupling and the handle assembly is cumbersome and time consuming. The pins must also be stored when the handle assembly is not in use. The handle assembly or the associated pins can easily be lost or misplaced.

What is needed, then, are improvements in conventional drawbars with handle assemblies.

BRIEF SUMMARY OF THE INVENTION

The present disclosure pertains to an improved drawbar apparatus for a cart, wagon, or trailer. The drawbar can be used to tow the cart, wagon, or trailer behind an automobile or tractor. The drawbar can also be converted to allow the cart, wagon, or trailer to be pulled by an operator.

One aspect of the present disclosure is a drawbar apparatus that can include a shaft having a shaft first end and a shaft second end. The shaft first end can be suitable for connection to a cart. The shaft second end can include a hitch coupling. The drawbar can further include a handle member having a handle first end and a handle second end. The handle first end can be pivotally connected to the shaft, and the handle second end can include a gripping region. The handle member can be selectively pivotal between a first position and a second position. The hitch coupling can extend distally beyond the handle member in the first position. The handle member can extend distally beyond the hitch coupling in the second position. As such, a cart, wagon, or trailer connected to the drawbar can be pulled via the drawbar by a vehicle when the handle member is in the first position, or the cart, wagon, or trailer can be pulled by an operator when the handle member is in the second position.

A second aspect of the present disclosure is a trailer apparatus including a cart having at least two wheels. A drawbar can be connected to the cart, the drawbar having a distal end. A hitch coupling can be located on the distal end of the drawbar. The trailer apparatus can include a handle member having a first end and a second end. The first end can be pivotally connected to the drawbar. The second end can include a grip. The handle member is selectively pivotal between a first position wherein the hitch coupling extends distally beyond the handle member, and a second position wherein the grip of the handle member extends distally beyond the hitch coupling. As such, the trailer apparatus can be attached to a vehicle via the hitch coupling and pulled by the vehicle when the handle member is in the first position. Additionally, an operator can pull the trailer apparatus by the handle member when the handle member is in the second position.

In either of the embodiments described above, a lock can be mounted or connected to the drawbar. The lock can be configured to selectively secure the handle member in the first position and the second position.

One objective of the present disclosure is to provide a drawbar that can be either hooked to a vehicle for towing or pulled by an operator.

One objective of the present disclosure is to provide a drawbar having a quicker transition between being configured to be pulled by a vehicle or being configured to be pulled by an operator.

One objective of the present disclosure is to provide a trailer apparatus that can be either hooked to a vehicle or pulled by an operator.

Numerous other objects, advantages and features of the present invention will be readily apparent to those of skill in the art upon a review of the following drawings and description.

DETAILED DESCRIPTION OF THE INVENTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
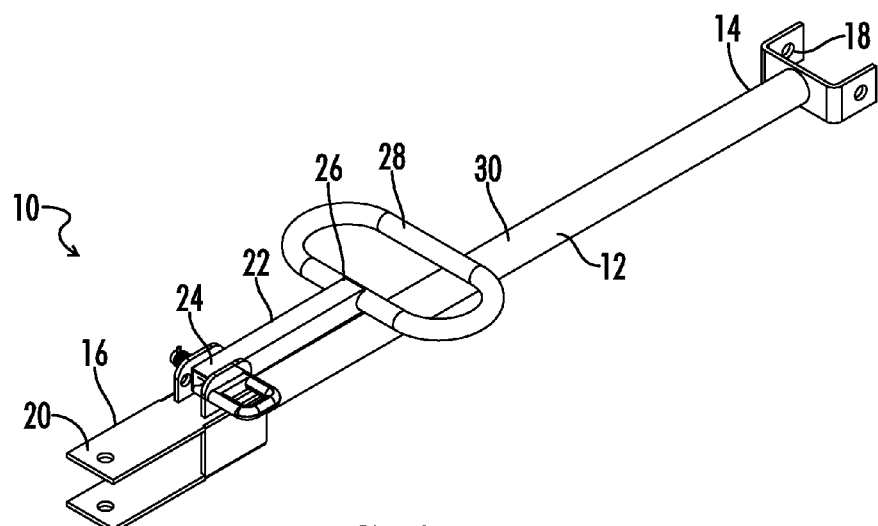
FIG. 1 is a side perspective view of an embodiment of a drawbar apparatus in a first position.

One embodiment of a drawbar apparatus 10 is shown in FIG. 1. The drawbar apparatus can include a shaft 12. The shaft 12 includes a shaft first end 14 and a shaft second end 16. The shaft first end 14 can be suitable for connection to a cart. In FIG. 1, the shaft first end 14 includes a bracket 18 which can be connected to a cart. The shaft second end 16 can include a hitch coupling 20. The hitch coupling seen in FIG. 1 includes a yoke. The hitch coupling 20 can be any suitable coupling known in the art that can be connected to a vehicle for pulling a cart or trailer attached to the drawbar 10.

The drawbar 10 can also include a handle member 22. The handle member 22 can have a handle first end 24 and a handle second end 26. The handle first end 24 can be pivotally connected to the shaft 12. The handle second end 26 can include a gripping region 28. The gripping region 28 can be configured to be received by an operator's hand. The handle member 22 is selectively pivotal between a first position and a second position. The handle member 22 is shown in the first position in FIG. 1. In the first position, the hitch coupling 20 extends distally beyond the handle member 22. From this position, the hitch coupling 20 can be connected to the hitch of a vehicle such as an automobile or tractor. A cart or trailer attached to the drawbar can then be pulled by the vehicle.

Figure 2:
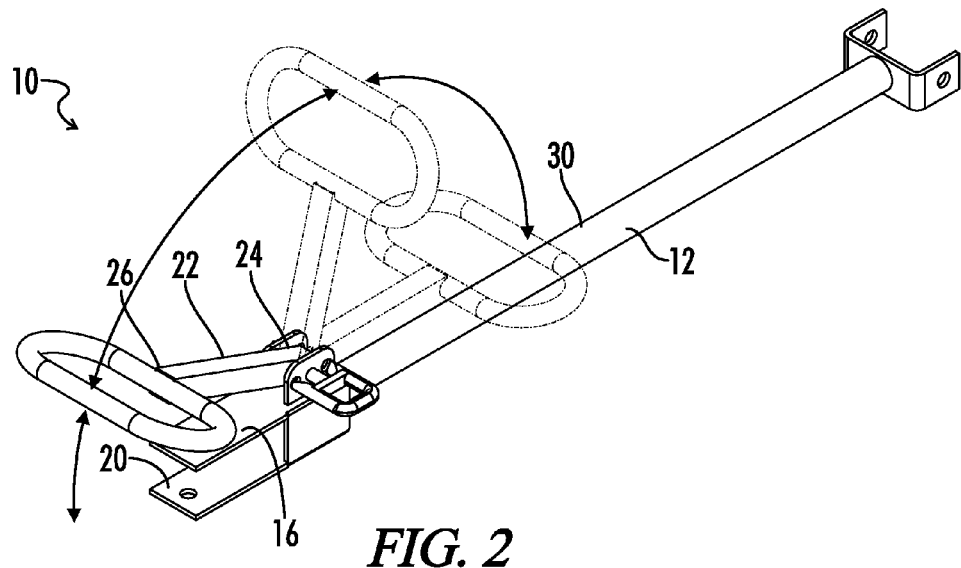
FIG. 2 is a side perspective view of the drawbar apparatus of FIG. 1 being rotated between a first position and a second position.

The handle member 20 is shown in FIG. 2 being rotated between the first position and a second position. The handle member 22 can rotate about the handle first end 24 back and forth between the two positions.

Figure 3:
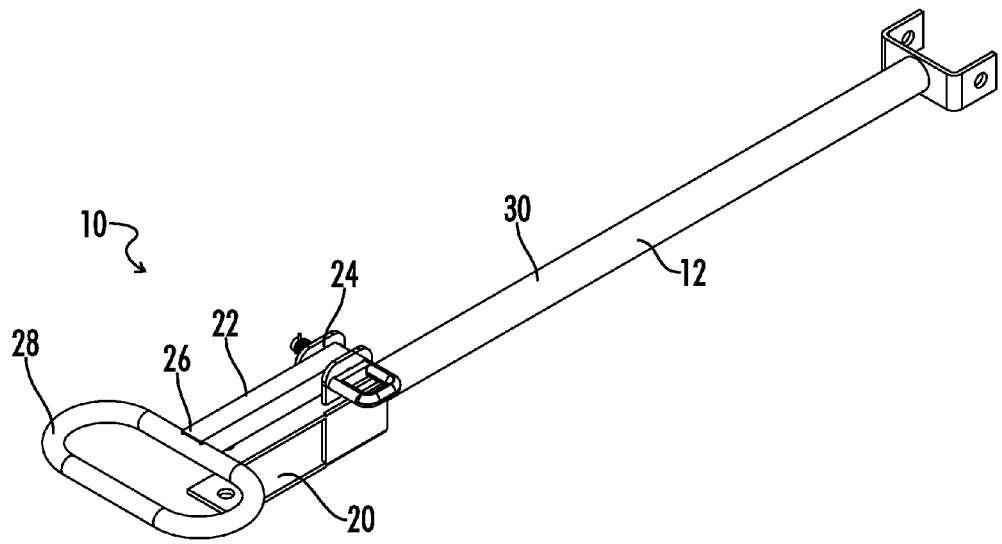
FIG. 3 is a side perspective view of the drawbar apparatus of FIG. 1 in a second position.

The handle member 22 is shown in FIG. 3 in a second position. In the second position, the gripping region 28 of the handle member 22 extends distally beyond the hitch coupling 20. In the second position, an operator can grasp the gripping region 28 of the handle member 22 and pull a cart or trailer attached to the drawbar 10. Thus, the handle member 22 can alternate between a first position allowing the hitch coupling 20 to be attached to a vehicle, and a second position allowing an operator to grasp the gripping region 28 and pull a cart or trailer attached to the drawbar 10.

As shown in FIG. 1-3, the shaft 12 can include a top surface 30. The handle first end 24 can be pivotally connected to the top surface 30 of the shaft 12. In FIG. 1-3, the handle member 22 is pivotally connected to the top surface 30 of the shaft 12 generally proximate to the second shaft end 16 and the hitch coupling 20. In some embodiments, the handle member 22 can be connected to a bottom surface of the shaft 12, and in still other embodiments, the handle member 22 can be connected to any side surface of the shaft 12. The handle member 22 can again be rotated between a first and second position in a similar manner as depicted in FIG. 1-3.

Figure 4:
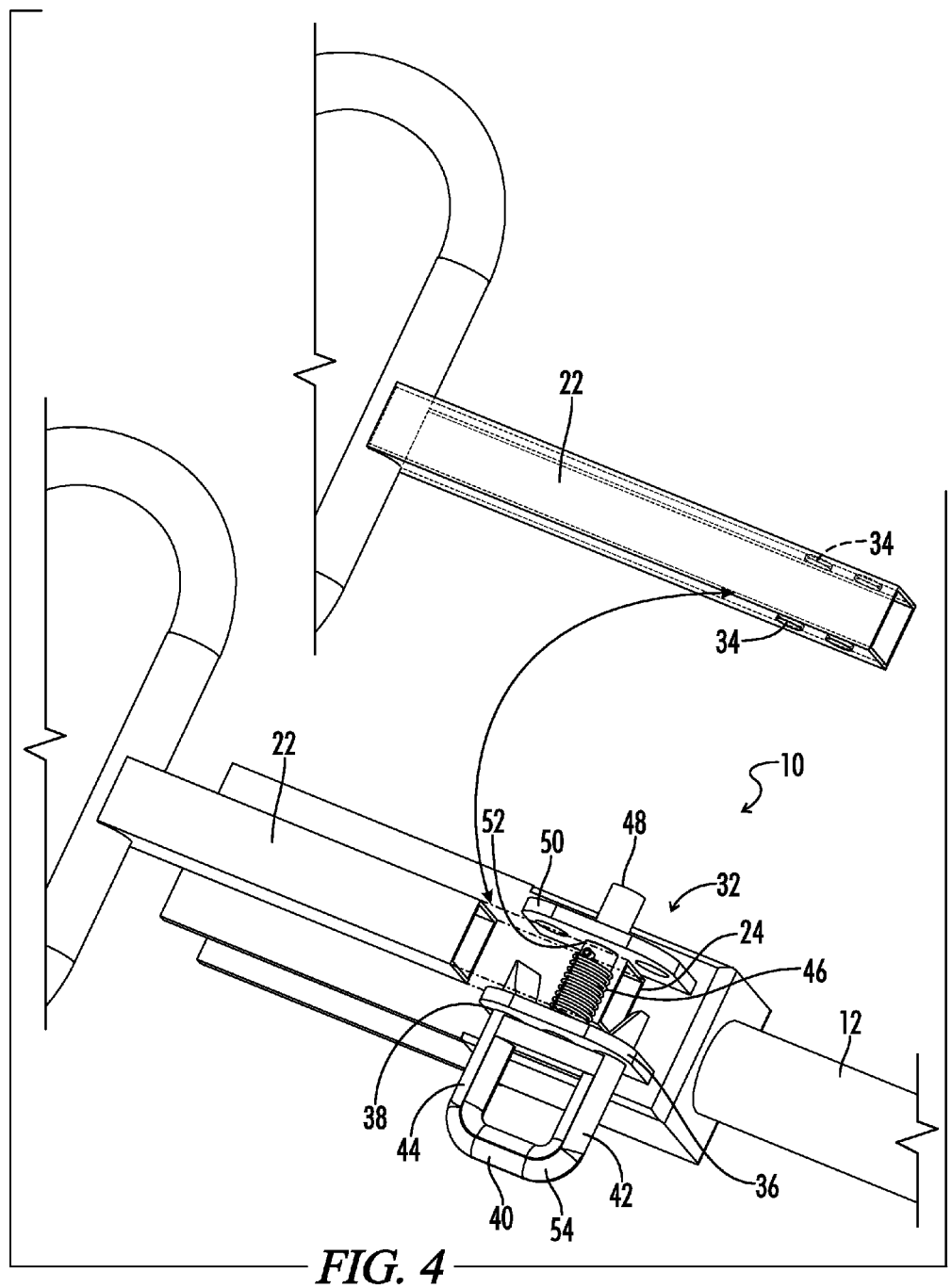
FIG. 4 is a top perspective view of a first embodiment of a lock for the drawbar apparatus of FIG. 1.

In some embodiments, the drawbar apparatus 10 may further include a lock 32. One embodiment of a lock 32 for the handle member 22 is shown in FIG. 4. In FIG. 4, a portion of the handle member 22 is cut away for visibility of the lock 32. The lock 32 can be configured to selectively secure the handle member 22 when the handle member 22 is in the first position and when the handle member 22 is in the second position.

The handle member 22 being secured in the first position can allow the handle member 22 to remain out of the operator's work space as the operator connects the hitch coupling 20 to a vehicle. Additionally, while the cart, wagon, or trailer being pulled behind the vehicle is in motion, the lock 32 secures the handle member in the first position so that the handle member 22 does not move during transport, which can help prevent potential damage to the drawbar 10 or the vehicle. Additionally, the lock 32 securing the handle member in the second position can prevent the handle member 22 from rotating relative to the shaft 12 when an operator is pulling a cart, wagon, or trailer. As such, when a cart, wagon, or trailer attached to the drawbar 10 is being pulled by an operator, the handle member 22 and the shaft 12 can act as one rigid structure.

In some embodiments, the lock 32 may further include a handle hole 34 disposed through the handle member 22. The lock 32 may further include a first flange 36 extending from the shaft 12. The first flange 36 may include at least one first flange hole 38. The lock 32 may further include a locking pin 40 extending through the at least one first flange hole 38. The locking pin 40 can have a first leg 42 and a second leg 44. The first leg 42 can be configured to selectively engage the handle hole 34 when the handle member 22 is in the first position. The second leg 44 can be configured to selectively engage the handle hole 34 when the handle member 22 is in the second position.

The lock 32 shown in FIG. 4 also includes a spring 46 that is engaged with the locking pin 40. The spring 46 biases the locking pin 40 toward the handle member 22 such that the locking pin 40 engages the handle member 22. In some embodiments, as shown in FIG. 4, the locking pin 40 includes a third leg 48. The handle first end 24 can then be pivotally connected to the shaft 12 by the third leg 48 of the locking pin 40. In one embodiment, as shown in FIG. 4, each of the first, second, and third legs 42, 44, and 48 extend through the first flange 36 to engage the handle member 22. In other embodiments, only the first and second legs 42 and 44 extend through the first flange 36. Having more than one leg of the locking pin 40 extend through the first flange 36 can help retain the locking pin 40 in a proper orientation for the first leg 42 and the second leg 44 to selectively secure the handle member 22 in the first position and the second position respectively.

In some embodiments, a second flange 50 can extend from the shaft 12. The second flange 50 can include a second flange hole 52, and the third leg 48 of the locking pin 40 can extend through the second flange hole 52. As such, the second flange 50 can provide additional support and stabilization for the locking pin 40 and the handle member 22.

The spring 46 included in the lock 32 shown in FIG. 4 is a compression spring disposed around the third leg 48 of the locking pin 40. The spring 46 can be located inside the handle member 22. The locking pin 40 can then be pulled in a direction away from the handle member 22 to disengage either the first leg 42 or the second leg 44 with the handle hole 34, which can allow the handle member 22 to rotate between the first and second positions. As the locking pin 40 is pulled in a direction away from the handle member 22, the spring 46 is compressed. Once the handle member 22 clears the locking pin 40, the locking pin 40 can be released, and the spring 46 can decompress, returning the locking pin 40 to a position such that the locking pin 40 can engage the handle member 22.

The locking pin 40 can also include a pin handle 54. The pin handle 54 can facilitate an operator pulling the locking pin 40 in a direction away from the handle member 22. An operator can insert their hand or fingers around the pin handle 54 in order to pull the locking pin 40 to a disengaged position.

Figure 5:
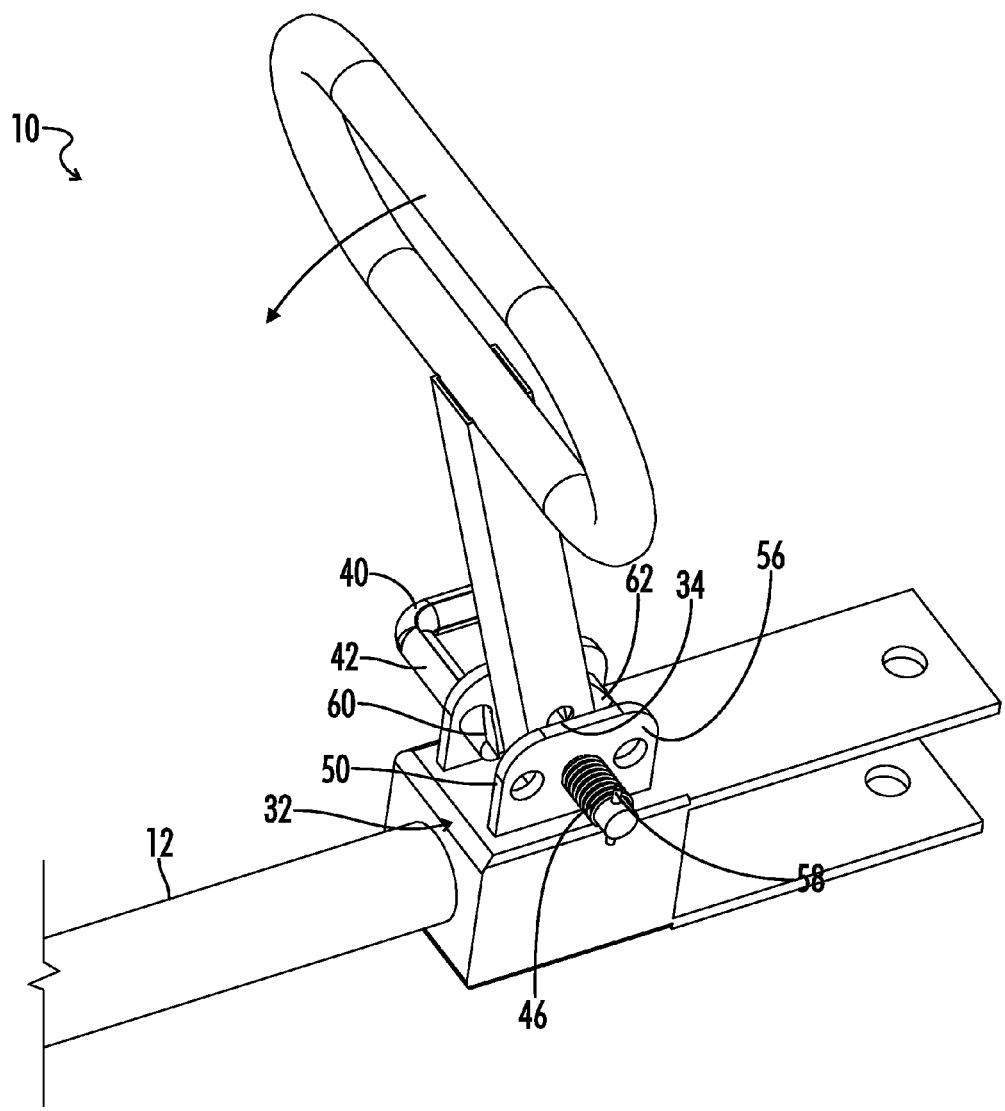
FIG. 5 is a top perspective view of a second embodiment of a lock for the drawbar apparatus of FIG. 1.

Another embodiment of a lock 32 for the drawbar apparatus 10 is shown in FIG. 5. The spring 46 can be disposed about the third leg 48 of the locking pin 40. Additionally, the spring can be disposed against the outer surface 56 of the second flange 50. The third leg 48 can include a retaining pin 58 that can retain the spring 46 against the outer surface 56 of the second flange 50. When the locking pin 40 is pulled in a direction away from the handle member 22, disengaging the locking pin 40 from the handle member 22, the retaining pin 58 can compress the spring 46. When the locking pin 40 is subsequently released, the spring 46 decompresses and forces the locking pin 40 back to a position such that it can engage the handle member 22. In some embodiments, the retaining pin 58 can be substituted with a retaining flange extending around the third leg 48 of the locking pin 40, the retaining flange retaining the spring 46 against the outer surface 56 of the second flange 50.

The spring 46 can be located at a variety of different positions on the lock 32 while achieving the same functionality. For instance, in some embodiments, the spring 46 can be disposed against the first flange 36, the third leg 48 including a retaining pin 58 that retains the spring 46 against the first flange 36. The spring 46 can then be similarly compressed as described above. Additionally, in some embodiments, the spring 46 can be disposed around either the first leg 42 or the second leg 44. Additionally, in some embodiments, the spring 46 can be a tension spring. The spring 46 can be configured to be stretched when the locking pin 40 is pulled in a direction away from the handle member 22. When the locking pin 40 is subsequently released, the spring 46 could then retract, returning the locking pin 40 to a position such that the locking pin 40 can engage the handle member 22.

Additionally, in some embodiments the first leg 42 of the locking pin 40 includes a first beveled edge 60. The second leg 44 of the locking pin 40 can also include a second beveled edge 62. The first and second beveled edges 60 and 62 can allow the handle member 22 to slide into the first position and the second position such that the handle hole 34 engages the first leg 42 and the second leg 44 respectively.

For instance, as the handle member 22 is rotated toward the first position, the handle member 22 can make contact with the first beveled edge 60. As the handle member 22 continues to rotate toward the first position, the handle member 22 can exert force against the first beveled edge 60, which can force the locking pin 40 to move in a direction away from the handle member 22. As the locking pin 40 moves away from the handle member, the spring 46 can become compressed.

Once the end of the first beveled edge 60 clears the handle member 22, the handle member 22 can then be rotated to the first position such that the first leg 42 axially aligns with the handle hole 34. As the first leg 42 and the handle hole 34 become axially aligned, the spring 46 can decompress, thereby inserting the first leg 42 into the handle hole 34, securing the handle member 22 in the first position. A similar mechanism can occur when the handle member 22 is rotated to the second position and can make contact with the second beveled edge 62 on the second leg 44 of the locking pin 40. Once the locking pin 40 has been pulled back and the handle member 22 is released to rotate, the addition of the beveled edges 60 and 62 can allow the operator to slide the handle member 22 into either the first position or the second position without having to hold the locking pin 40 in a withdrawn position, which can make for a quicker transition between the first and second positions.

Figure 6:
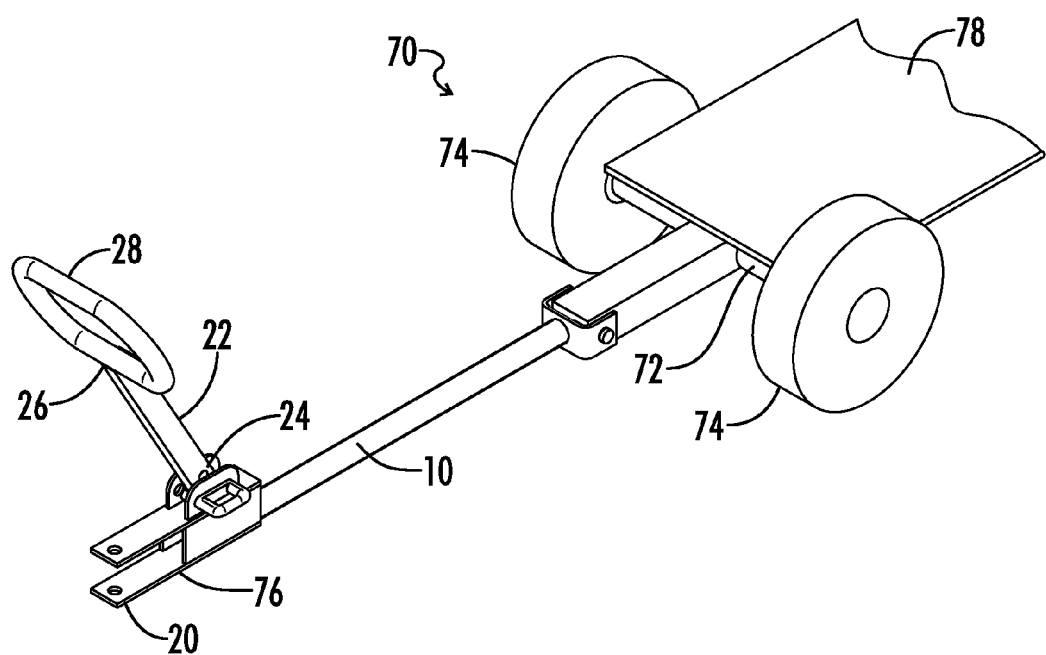
FIG. 6 is a side perspective view of a trailer apparatus including the drawbar of FIG. 1.

Another aspect of the present disclosure is shown in FIG. 6. A trailer apparatus 70 includes a cart 72 that includes at least two wheels 74. A drawbar 10 can be connected to the cart 72. The drawbar 10 can have a distal end 76. A hitch coupling 20 can be located on the distal end 76 of drawbar 10. The trailer apparatus can further include a handle member 22. The handle member 22 can have a first end 24 connected to the drawbar 10 and a second end 26 including a grip 28. The grip 28 can be configured to receive an operator's hand. The handle member 22 is selectively pivotal between a first position wherein the hitch coupling 20 extends distally beyond the handle member 22, and a second position wherein the grip 28 extends distally beyond the hitch coupling 20. When the handle member 22 is in the first position, the trailer apparatus 70 can be connected via the hitch coupling 20 to the hitch of a vehicle such as an automobile or tractor and pulled behind the vehicle. When the handle member 22 is in the second position, an operator can pull the trailer 70 by grasping the grip 28 of the handle member 22.

The cart 72 included in the trailer apparatus 70 can be any cart suitable for carrying or transporting objects or materials. The cart 72 can have at least two wheels 74. In some embodiments the cart 72 can have 4 wheels. The cart 72 shown in FIG. 6 has a carrying portion 78 that includes a flat surface. In some embodiments, the carrying portion 78 can further include one or more sidewalls which can help retain objects or materials in the cart 72.

Furthermore, in some embodiments, the trailer apparatus 70 can include a lock 32 which can selectively secure the handle member 22 in both the first position and the second position. The lock 32 can be mounted to the drawbar 10. The lock can be similar to any of the embodiments previously described above.

Thus, although there have been described particular embodiments of the present invention of a new and useful Quick Change Dual Purpose Draw Bar it is not intended that such references be construed as limitations upon the scope of this invention except as set forth in the following claims.

What is claimed is:

1. A drawbar apparatus comprising:
   a shaft having a shaft first end and a shaft second end, the shaft first end suitable for connection to a cart, the shaft second end including a hitch coupling;
   a handle member having a handle first end and a handle second end, the handle first end pivotally connected to the shaft, the handle second end including a gripping region;
   wherein the handle member is selectively pivotal between a first position and a second position, the hitch coupling extending distally beyond the handle member in the first position so the hitch coupling can receive a hitch when the handle member is in the first position, the gripping region of the handle member extending distally beyond the hitch coupling in the second position; and
   a lock configured to selectively secure the handle member when the handle member is in the first position and the second position, wherein the lock further comprises:
   the handle member having a handle hole disposed through the handle member;
   a first flange extending from the shaft the first flange including at least one first flange hole;
   a locking pin extending through the at least one first flange hole, the locking pin having a first leg and a second leg, the first leg configured to selective engage the handle hole when the handle member is in the first position, the second leg configured to selectively engage the handle hole when the handle member is in the second position; and
   a spring engaged with the locking pin, the spring biasing the locking pin toward the handle member.

2. The apparatus of claim 1, wherein the locking pin further comprises a third leg, and the first end of the handle member is pivotally connected to the shaft by the third leg of the locking pin.

3. The apparatus of claim 2, further comprising a second flange extending from the shaft, the second flange including a second flange hole, the third leg of the locking pin extending through the second flange hole.

4. The apparatus of claim 1, wherein the first leg of the locking pin further comprises a first beveled end and the second leg of the locking pin further comprises a second beveled end.

5. The apparatus of claim 1, wherein the spring is a compression spring.

6. The apparatus of claim 1, wherein the locking pin further comprises a pin handle.

7. The apparatus of claim 1, wherein the shaft further includes a top surface and the first end of the handle member is pivotally connected to the top surface.

8. The apparatus of claim 1, wherein the hitch coupling includes a yoke.

9. A trailer apparatus comprising:
   a cart having at least two wheels;
   a drawbar connected to the cart, the drawbar having a distal end;
   a hitch coupling located on the distal end of the draw bar; and
   a handle member having a first end and a second end, the first end pivotally connected to the drawbar, the second end including a grip;
   wherein the handle member is selectively pivotal between a first position wherein the hitch coupling extends distally beyond the handle member so the hitch coupling can receive a hitch when the handle member is in the first position, and a second position wherein the grip of the handle member extends distally beyond the hitch coupling; and
   a lock mounted on the drawbar, the lock configured to selectively secure the handle member when the handle member is in the first position and selectively secure the handle member when the handle member is in the second position, wherein the lock further comprises:
      the handle member having a handle hole defined therein;
      a locking pin having a first leg and a second leg, the first leg positioned to selectively engage the hole in the handle member when the handle member is in the first position, the second leg positioned to selectively engage the hole in the handle member when the handle member is in the second position; and
      a spring engaging the locking pin, the spring configured to bias the locking pin towards the handle member.

10. The apparatus of claim 9, wherein the locking pin further comprises a pin handle.

11. The apparatus of claim 9, wherein the first leg of the locking pin further comprises a first beveled end and the second leg of the locking pin further comprises a second beveled end.

12. The apparatus of claim 9, further comprising a flange extending from the drawbar, the flange having at least one flange hole, the at least one flange hole receiving the locking pin, the spring disposed against the flange.

13. The apparatus of claim 9, wherein the hitch coupling comprises a yoke.

14. The apparatus of claim 9, wherein the drawbar further comprises a top surface and the first end of the handle member is pivotally connected to the top surface of the drawbar.

* * * * *